United States Patent [19]
Martin et al.

[11] Patent Number: 5,999,621
[45] Date of Patent: Dec. 7, 1999

[54] LINE CARD SHELF

[75] Inventors: James T. Martin, Rohnert Park; Bruce H. Bowie; George T. Hawley, both of Santa Rosa, all of Calif.

[73] Assignee: Nokia High Speed Access Products, Inc., Petaluma, Calif.

[21] Appl. No.: 08/902,764

[22] Filed: Jul. 30, 1997

[51] Int. Cl.⁶ ............................ H04M 1/00; H04M 3/00
[52] U.S. Cl. ................................ 379/438; 379/327
[58] Field of Search ............................ 379/441, 399, 379/438, 357, 325–328; 361/737, 741, 736, 753, 756, 760; 174/53, 59

[56] References Cited

U.S. PATENT DOCUMENTS

| | | | |
|---|---|---|---|
| 4,017,770 | 4/1977 | Valfre | 361/756 |
| 4,331,839 | 5/1982 | Baumbach | 179/98 |
| 4,548,448 | 10/1985 | Ellison et al. | 339/17 |
| 4,672,602 | 6/1987 | Hargrave et al. | 370/58 |
| 4,790,762 | 12/1988 | Harms et al. | 439/59 |
| 4,806,107 | 2/1989 | Arnold et al. | 439/79 |
| 4,829,564 | 5/1989 | Jarvis | 379/327 |
| 4,975,072 | 12/1990 | Afshar | 439/131 |
| 5,001,602 | 3/1991 | Suffi et al. | 361/390 |
| 5,381,315 | 1/1995 | Hamaguchi et al. | 361/727 |
| 5,580,257 | 12/1996 | Harwath | 439/108 |
| 5,649,224 | 7/1997 | Scheer | 395/800 |
| 5,650,916 | 7/1997 | Osaki et al. | 361/737 |

*Primary Examiner*—Jack Chiang
*Attorney, Agent, or Firm*—Fish & Richardson P.C.

[57] ABSTRACT

A line card shelf is disclosed. The line card shelf includes groups of line card receptacle connectors. Each receptacle connector has electrical contacts receiving corresponding line card contacts. Each group of receptacle connectors is coupled to at least two external connectors that terminate an inside or outside wiring cable bundle. Each receptacle in each group is connected to each external connector of the receptacle's group by a two-conductor signal path between a pair of electrical contacts in the receptacle and a unique pair of external electrical contacts in the external connector.

23 Claims, 4 Drawing Sheets

LINE CARD SHELF

BACKGROUND

The present invention relates to line card shelves, and more particularly to line card shelves for use with spectrally incompatible signal groups.

Copper wire pairs are used to provision many telephony services. The copper pairs, also referred to as a loop, typically extend from a customer's premises and terminate at a main distribution frame (MDF) in a telephone company central office. The copper pairs are arranged in bundles, typically of twenty-five or more pairs. These bundles are referred to as outside plant cable.

Outside plant cable is connected to an inside cable through a protection device at the main distribution frame. The protection device isolates central office equipment from external hazards such as electrical surges due to lightning strikes on the external cable. Inside cable, typically arranged like outside cable in bundles that consist of fifty wires arranged in two-wire pairs, is used to connect to a central office line card shelf. The line card shelf is a terminating point for the copper loop between the central office and the customer's location.

At the line card shelf, inside plant cable is terminated on conductive terminals. These terminals provide signal paths to line card receptacle connectors in the line card shelf. A circuit board, known as a line card, is inserted in a shelf receptacle connector forming a signal path between line card circuitry and the copper loop. Line cards and associated line card shelf circuitry are used to transmit signals on copper loops and to link copper loops to central office switching equipment. The line card shelf provides a link to central office switching equipment through master shelf interface circuitry.

Signals transmitted to and from the line card shelf on copper pairs are subject to interference caused by electromagnetic fields. Interfering fields are produced by, for example, signals carried on other copper loops. When copper loops are in close proximity, such as when they are located next to each other in an inside cable or in an outside cable, the electromagnetic fields produced by one copper pair may induce interference signals on other pairs. These interference signals are problematic for some transmission technologies. To minimize interference in such technologies, wire pairs must be carefully separated to minimize coupling of spectrally incompatible signals.

SUMMARY

In general, in one aspect, the invention features a telephony line card shelf including groups of line card receptacle connectors. Each receptacle connector has electrical contacts that receive corresponding line card electrical contacts. Receptacle connectors are arranged in groups that connect to at least two external connectors. The external connectors provide a terminating point for an inside or outside wiring cable bundle. Each receptacle connector is connected to each external connector by a two-conductor signal path between a pair of electrical contacts in the receptacle and a unique pair of external electrical contacts in the external connector.

Implementations of the invention may include one or more of the following. Each line card receptacle can be substantially identical, and/or have receptacle contacts that are connected to external wire bundle connectors at the same location in each receptacle. Line card receptacles can connect to a common backplane that connects to common shelf circuitry that provides functionality shared by all line cards in the line card shelf. The common shelf circuitry can further include shelf interface functionality to connect to switching equipment.

The line card shelf can provide external interfaces to switching equipment. Furthermore, the line card shelf can have external wire bundle connectors to connect to standard telephony fifty wire bundles. A line card shelf can have twenty-four or more line card receptacles arranged in groups. Each group can include, for example, six receptacle connectors connected to two external wire bundle connectors.

In general, in another aspect, the invention features a system for the separation of wire pair transmission signals. The system includes a line card shelf having line card receptacle connectors organized into groups, a line card having at least one transceiver for the transmission and reception of signals on wire pairs, and at least two external wire bundle connectors. Wire bundle connectors are connected to each line card receptacle group so that when a line card is installed in a line card shelf receptacle connector, signals from line card transceivers are routed to external wire bundle connectors with each external wire bundle connector terminating spectrum compatible signals.

Implementations of the invention may include line card transceiver using either one or two pairs of conductors to transmit and receive signals. For transceivers using two pairs of conductors, each conductor pair may be coupled to a different external wire bundle connector when the line card is received by the line card shelf receptacle.

Implemenations may also include multiple line card groups having one or more line cards. Each group can include line cards with transceivers that use either a single pair of conductors to transmit and receives signals, or that use two pairs of conductors to transmit and receive signals. Each line card group may differ in, for example, the number of conductors used by line cards within the group. Line card receptacle connector can be substantially identical and include, for example, four pairs of contacts connecting to a first external wire bundle connector and four pairs of contacts connecting to a second external wire bundle connector.

Among the advantages of the invention are one or more of the following. The invention facilitates separation of copper loop transmission signals into spectrally compatible wire pair groupings and facilitates organization of required central office cabling into standard twenty-five pair groupings. Furthermore, the invention reduces loop provisioning time by automating wire bundle connections and loop allocations.

Other features and advantages of the invention will become apparent from the following description and from the claims.

DETAILED DESCRIPTION

Figure 1:
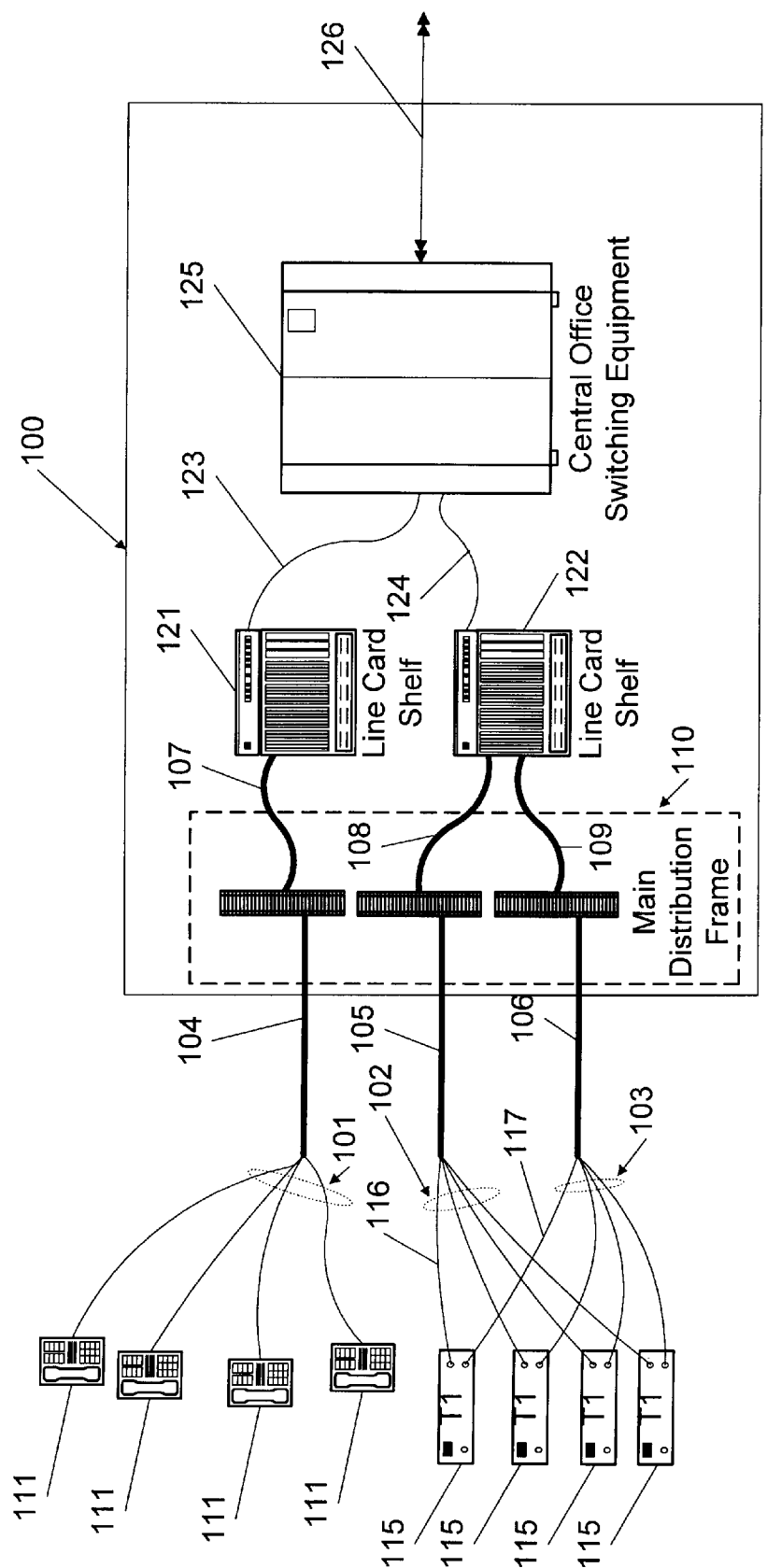
FIG. 1 is a schematic diagram of a telephone company central office having line card shelves according to the invention.

Referring to FIG. 1, copper wire pairs 101–103 are used to provision many telephony services. These wire pairs typically originate at customer premises equipment, for example, a residential telephone 111 having a two-wire connection to the central office, or a high speed digital T1 transmission unit 115 having a four-wire connection to the central office. Copper pairs from the central office 100 to customer premises are joined into bundles 104–106. These bundles are referred to as outside plant cable. Each bundle 104–106 typically contains twenty-five or more two-wire pairs. Typically, twenty-four of the twenty-five pairs are used to provision service and the twenty-fifth pair is a spare pair.

Outside plant cable 104–106 is connected to inside cable 107–109 at the central office main distribution frame 110. Inside cable, 107–109, which may be arranged like outside cable in bundles consisting of twenty-five two-wire pairs, is used to provide connections from the main distribution frame 110 to central office line card shelves 121, 122. As in an outside cable, typically only twenty-four of the twenty-five wire pairs in an inside cable are used to provision service. The line card shelves 121, 122 are terminating points for the copper pair connections between the central office 100 and customer premises equipment.

At the line card shelves 121, 122, signals from inside cables 107–109 are routed to line cards. Line cards are interchangeable circuit boards that may be removably inserted in a line card shelf. Line cards and line card shelf circuitry transform copper pair transmission signals into a format compatible with central office switching equipment 125. These signals are provided to central office switching equipment 125 over interconnections 123, 124 between line card shelves 121, 122 and the switching equipment 125. Switching equipment 125 may have a number of additional interfaces 126 allowing interconnection to additional line card shelves and for signal transmission to other central offices.

Figure 2A:
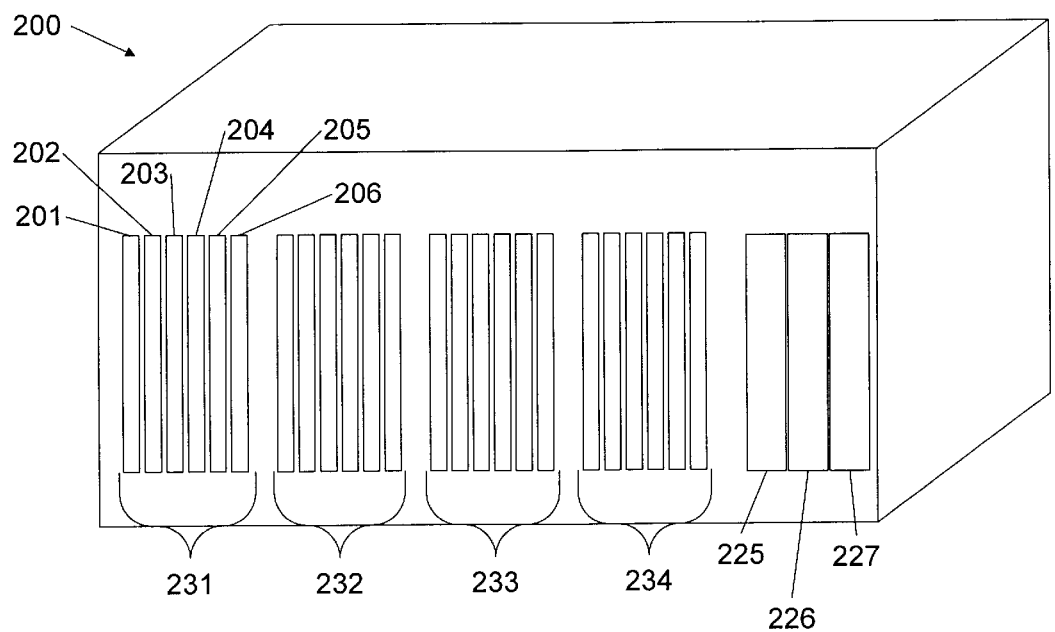
FIG. 2A is a front perspective view of a line card shelf according to the invention.

Referring to FIG. 2A, a line card shelf 200 having twenty-four line card slots is shown. Line card slots are arranged in four groups 231–234 each having six line card slots. For example, card slot group 231 has line card slots 201–206. The shelf 200 also has power supply circuitry 225, shelf control circuitry 226, and shelf interface circuitry 227. Power supply circuitry 225 provides power to operate shelf and line card circuitry. Shelf control circuitry 226 provides control logic to regulate line card functionality. Shelf interface circuitry 227 exchanges data with line cards and provides signals in a standard format to central office equipment such as a central office switch 125 (FIG. 1). Signals provided by interface circuitry 227 will typically be in a standard central office equipment format such as an optical carrier 3 (OC-3) synchronous optical network (SONET) signal format or a T-3 digital signal format. Although shown separately, the line card shelf power supply 225, control 226, and interface 227 circuitry need not be implemented as separate components.

Figure 2B:
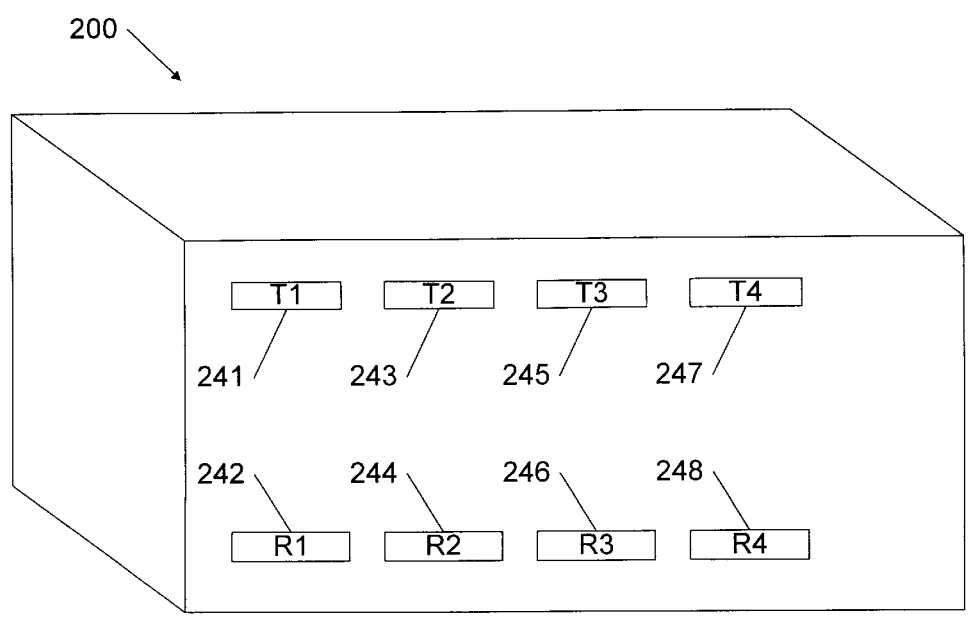
FIG. 2B is a rear perspective view of a line card shelf according to the invention.

FIG. 2B is a rear perspective view of the line card shelf 200 depicting eight external connectors 241–248 each having fifty electrical contacts. Each external connector 241–248 is, for example, an AMP™ CHAMP™ 50 pin connector. Therefore, as many as eight twenty-five pair inside plant cables connect to the depicted line card shelf using these external connectors. Each line card slot group 231–234 has signal connections to two of the external connectors arranged such that line card slot group 231 connects to external connectors 241 and 242, line card slot group 232 connects to external connectors 243 and 244, line card slot group 233 connects to connectors 245 and 246, and line card slot group 234 connects to connectors 247 and 248. Thus, each line card slot group 231–234 provides signal connections to two external wire bundle connectors allowing each line card slot group 231–234 to connect to up to two cables each having twenty-five wire pairs.

Figure 3A:
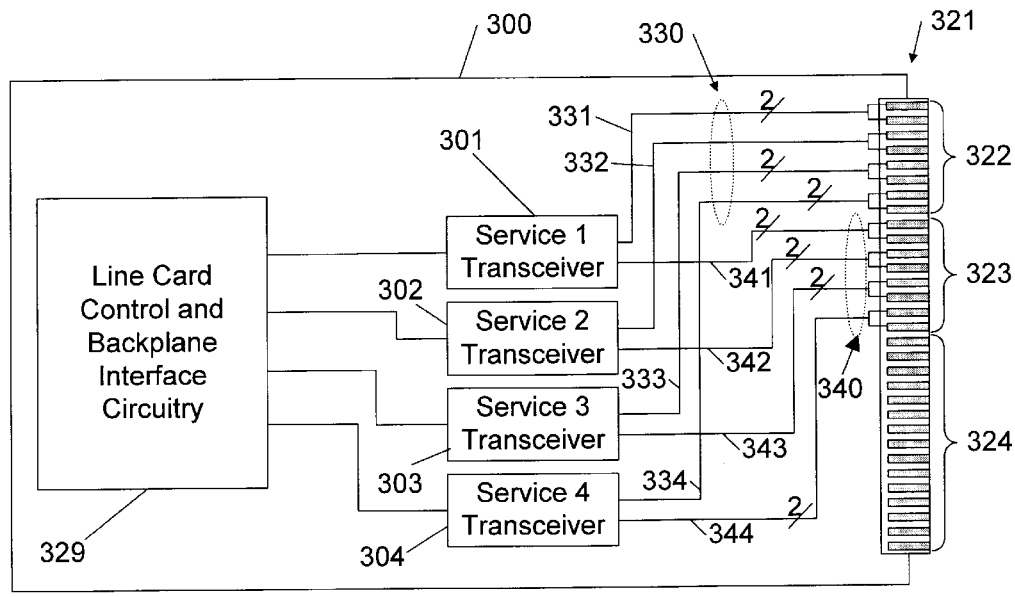
FIG. 3A is a schematic block diagram of a line card that is used to provision two-wire services according to the invention.
Figure 3B:
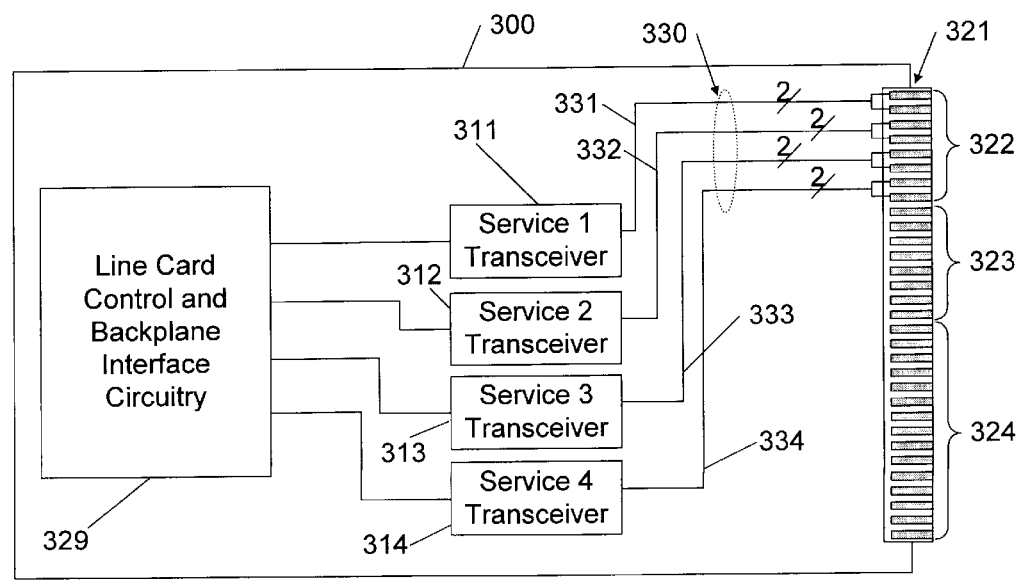
FIG. 3B is a schematic block diagram of a line card that is used to provision four-wire services according to the invention.

FIG. 3A and 3B illustrate two different configurations of a line card 300. A line card may be removably inserted in a line card shelf 200. Interchangeable line cards allow flexible reconfiguration of copper loop facilities to meet customer service demands. By choosing an appropriate line card, a copper loop may be provisioned to transmit signals for such telephony services as, for example, plain old telephone service (POTS), High bit rate Digital Subscriber Line (HDSL), 1.544 Mbit/second T1 transport, Asymmetric Digital Subscriber Line (ADSL), and Integrated Service Digital Network (ISDN) service.

Each line card 300 has an edge connector 321. The connector 321 has contact pad arrays 322–324 that are received by a receptacle connector within the line card shelf 200. A line card 300 has transceiver circuitry 301–304 (FIG. 3A) and 311–314 (FIG. 3B) to transmit and receive signals for, for example, up to four service connections. Transceiver circuits 301–304 are each associated with a four-wire service while transceiver circuits 311–314 are each associated with a two-wire service. Additional line card circuitry 329 controls line card functionality and provides an interface to the line card shelf over line card contact pad array 324. Contact pad array 324 provides a terminating point for connections (not illustrated) between line card circuitry and, for example, the line card shelf power supply 225, the master line card shelf controller 226, and the line card shelf data bus. The number of contact pads in contact pad array 324 may differ depending on the specific line card and line card shelf implementation.

In FIG. 3A, a line card implementing a four-wire service, such as T1 transmission service, is shown. Each of transceivers 301–304 interfaces with contact pad arrays 322 and 323 using a two-conductor connection between each transceiver and each contact pad array. For example, the service transceiver 301 uses conductor pair 331 to connect to pad array 322 and uses conductor pair 341 to connect to pad array 323. Thus each of contact pad arrays 322, 323 terminate four two-conductor signals. Service transceivers 302, 303, 304 are similarly connected to contact pad arrays 322 and 323.

In FIG. 3B, a line card implementing a two-wire service, such as POTS transmission, is shown. Each transceiver 311–314 interfaces with contact pad array 322 using a single two-conductor pair 331–334. For example, service transceiver 311 uses conductor pair 331 to connect to contact pad array 322. Service transceivers 312, 313, and 314 are similarly connected. Thus, contact pad array 322 terminates four two-conductor signals while contact pad array 323 is unused. Alternatively, a two-wire service line card may be constructed with eight service transceivers. In an eight transceiver case, the fifth through eighth service transceivers would terminate signals on contact pad array 323.

Figure 4:
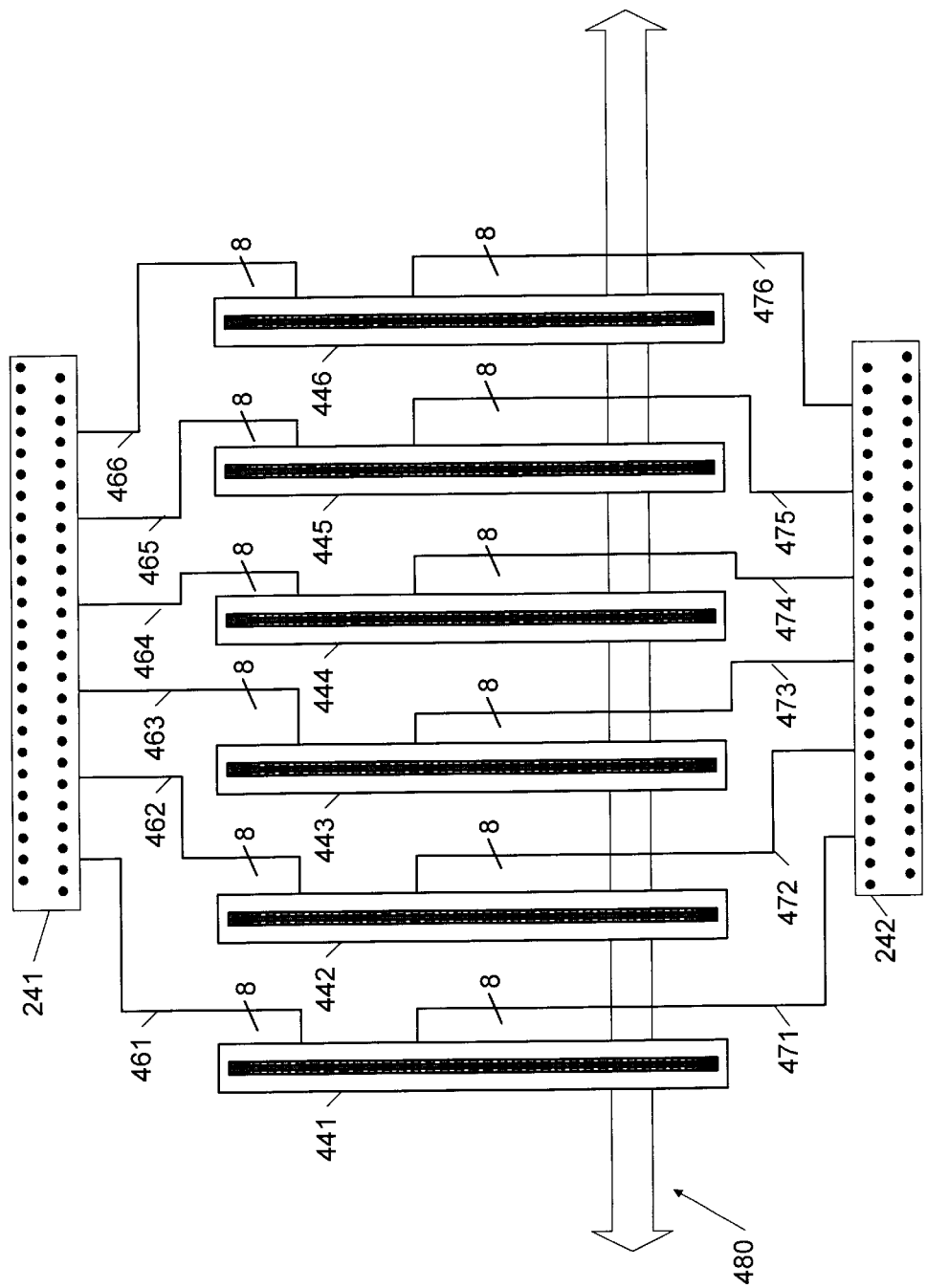
FIG. 4 is a diagram of a section of a line card shelf backplane according to the invention.

In FIG. 4, a portion of the backplane of line card shelf 200 having a group of six line card receptacle connectors 441–446 is illustrated. Line card receptacle connectors 441–446 removably receive the connector edge 321 of a line card 300 that is inserted into a shelf slot 201–206. Each receptacle connector 441–446 has an eight conductor signal path 461–466, 471–476 to each of the external wire bundle connectors 241 and 242, respectively. For example, receptacle connector 441 connects to external connector 241 using signal path 461 and connects to external connector 242 using signal path 471. Each receptacle connector 441–446 also connects to backplane signal bus 480. Backplane signal bus 480 provides power from the shelf power supply circuitry 225 to the line card and allows signal exchange between the line card and the master shelf controller 226 and the master shelf interface 227. The number of connectors between line card receptacle 441–446 and signal bus 480 is determined by the specific card shelf implementation.

When a line card, such as card 300 of FIG. 3A, is inserted in a line card shelf slot, for example, slot 201 of FIG. 2A, the line card edge connector 321 mates with a card receptacle connector, for example, connector 441, on the card shelf backplane. This mating interconnects line card contact pad array 322 to external connector 241 by means of a backplane eight-conductor signal path, for example, path 461, and interconnects contact pad array 323 to external connector 242 by means of a second backplane eight-conductor signal path, for example, path 471. In addition, the mating between line card edge connector 321 and a card shelf receptacle connector results in interconnection of line card pad array 324 and line card shelf bus 480.

A second, third, fourth, fifth, and sixth line card may be similarly inserted in the line card shelf and mated with backplane receptacle connectors 442–446. This results in twenty-four two-conductor interconnections between the six line cards and external connector 241 and a second set of twenty-four two-conductor connections between the line cards and external connector 242. The described backplane arrangement corresponds to the six card slot group 231 and external connectors 241, 242.

A complete line card shelf will have multiple similarly arranged line card receptacle connectors and external connectors corresponding to line card slot groups 232–234. The use of multiple line card groups permits the sharing of common shelf components such as power supply 225, shelf control circuitry 226, and interface circuitry 227.

The described line card and card shelf backplane receptacle connector arrangement may advantageously be used to separate spectrally incompatible copper loop signals into compatible signal groupings. As explained below, provisioning copper loop facilities for T1 service connections illustrates an application of this signal separation.

Referring back to FIG. 1, a T1 service is a four-wire transmission service using two copper wires pairs to transmit signals between a central office and a customer premises. A customer premises T1 end unit 115 has a transmit pair 116 and a receive pair 117 connection. The transmit pair 116 is used to transmit a modulated 1.544 Mbps signal to the central office end unit. The receive pair 117 is used to receive a modulated 1.544 Mbps signal from the central office end unit.

To minimize signal interference, T1 transmit and receive pairs should not be placed in close proximity to each other, in particular, they should not be placed in the same inside or outside wire bundle. Thus, when T1 service is provisioned, transmit pairs 116 from T1 units 115 are separated from receive pairs 117 and placed into separate outside 105, 106 and inside 108, 109 cable bundles. Each cable bundle 105, 106, 108, 109 may contain transmit pairs or receive pairs from multiple T1 service connections, but may not contain both transmit and receive pairs within a single cable bundle.

Referring to FIG. 3A, to facilitate T1 signal separation, a line card 300 having four T1 transceivers 301–304 is constructed such that the transmit signals from the transceivers are transmitted on line card conductors 331–334 to contact pad array 322 while the receive signals are received on conductors 341–344 from contact pad array 323.

Referring to FIG. 4, when such a T1 line card is inserted in a backplane receptacle connector 441–446, the four transmit signal pairs are routed to external connector 241 along one of signal paths 461–466 while the four receive signal pairs are routed from external connector 242 along one of signal paths 471–476. This provides the desired separation of transmission signals into spectrally compatible groupings.

A group of six such T1 line cards may be inserted in receptacle connectors 441–446 resulting in twenty-four transmit signal pairs terminating on external connector 241 and twenty-four receive signal pairs terminating on external connector 242. Inside wiring cable bundles attached to line card shelf external connectors 241, 242 will thus contain only transmit or only receive signals.

Other embodiments are within the scope of the following claims. For example, the grouping of card receptacle connectors may be in groups larger or smaller than six to accommodate or exploit cable sizes larger or smaller than 24-pair 50-wire bundles, with a corresponding change in the size of the external connector for the groups. The line card shelf may be configured for more or fewer than four groups of cards. The cards may have more or fewer than four transceivers. Multiple transceivers may be fashioned as a single integrated circuit. Each group of cards may have more than one pair of connectors. An outside or inside wiring cable bundle need not have twenty-five wire pairs, smaller or larger wire bundles may be used, for example, twelve-pair bundles, one-hundred pair bundles, or five-hundred pair bundles may be used. A line card group may connect to more than two external connectors. In addition to receptacle connectors having four two-conductor connections to each external wire bundle connector, a line card shelf may have receptacle connectors with one or more connectors to each of two or more external wire bundle connectors.

What is claimed is:

1. A telephony line card shelf, comprising
   a group of line card receptacle connectors, each receptacle connector having electrical contacts configured to receive corresponding electrical contacts of a line card installed in the receptacle connector, and the group having at least two external wire bundle connectors; where
   each external wire bundle connector has external electrical contacts providing a terminating point for an inside or outside wiring cable bundle; and
   each receptacle in the group is electrically connected to each external wire bundle connector by a signal path between an electrical contact in the receptacle and a unique external electrical contact in the external connector.

2. The line card shelf of claim 1, wherein for each receptacle, the receptacle contacts that are connected to external wire bundle connectors are at the same receptacle location.

3. The line card shelf of claim 1, wherein all receptacles are substantially the same.

4. The line card shelf of claim 1, wherein all the line card receptacle connectors connect to a common backplane.

5. The line card shelf of claim 4, wherein the backplane comprises signal paths to connect the line card receptacle connectors to common shelf circuitry which provides functionality shared by all line cards inserted in the line card shelf.

6. The line card shelf of claim 5, wherein the common shelf circuitry provides an interface for connecting to switching equipment.

7. The line card shelf of claim 1, wherein the shelf provides external interfaces for connecting to switching equipment.

8. The line card shelf of claim 1, wherein the external wire bundle connector is a connector for a standard telephony fifty wire bundle.

9. The line card shelf of claim 1 wherein the line card shelf comprises multiple groups of line card receptacle connectors.

10. The line card shelf of claim 1, wherein the group comprises six receptacle connectors connected to two external wire bundle connectors.

11. A system for the separation of wire pair transmission signals comprising:

a line card shelf having line card receptacle connectors organized into a group;

a first line card having at least one transceiver for the exchange of first spectrum signals on wire pairs;

a second line card having at least one transceiver for the exchange of second spectrum signals on wire pairs, the second spectrum signals comprising signals that are spectrally incompatible with the first spectrum signals: and at least two external wire bundle connectors, each wire bundle connector connected to each line card receptacle connector in the group by connecting signal paths arranged so that signals from line card transceivers are routed to external wire bundle connectors with each external wire bundle connector terminating only spectrum compatible signals.

12. A system according to claim 11, wherein the first line card and the second line card are different line cards, and wherein each transceiver of each line card uses a single pair of conductors to exchange signals.

13. A system according to claim 11, wherein each transceiver of each line card uses two pairs of conductors to exchange signals, the first pair of which is coupled to a first external wire bundle connector and the second pair of which is coupled to a second external wire bundle connector when said line cards are received by the line card shelf receptacle connectors.

14. A system according to claim 11, wherein the group has at least one line card, each line card of the group having transceivers that use a single pair of conductors to transmit and receive signals, each pair of conductors coupled to an external wire bundle connector when the line card is received by the line card shelf receptacle; and wherein the line card shelf further comprises:

a second group having line card receptacle connectors and external wire bundle connectors configured substantially the same as those in the group, and the second group having at least one line card, each line card of the second group having transceivers that use a first and a second pair of conductors to transmit and receive signals, the first pair of conductors coupled to the first external wire bundle connector and the second pair of conductors coupled to a second external wire bundle connector when said second group line card is received by the line card shelf receptacle.

15. A system according to claim 11, wherein each line card receptacle connector has a pair of contacts connecting to a first external wire bundle connector and a second pair of contacts connecting to a second external wire bundle connector.

16. A system according to claim 11, wherein each line card receptacle connector has four pairs of contacts connecting to a first external wire bundle connector and a second pair of four contacts connecting to a second external wire bundle connector.

17. A system according to claim 11, wherein each line card receptacle connector has eight pairs of contacts connecting to a first external wire bundle connector and a second pair of eight contacts connecting to a second external wire bundle connector.

18. A method of separating transmission signals in a line card shelf having shelf signal paths coupling a plurality of line card receptacle connectors to external wire bundle connectors, comprising:

partitioning line card shelf signal paths into a first shelf signal path group and a second shelf signal path group;

coupling each of the plurality of line card receptacle connector to a first wire bundle connector using a different signal path selected from the first shelf signal path group; and coupling each of the plurality of line card receptacle connector to a second wire bundle connector using a different signal path selected from the second line card shelf signal path group.

19. The method of claim 18 further comprising:

partitioning line card transceiver signals into a first transceiver signal group; and coupling the first transceiver signal group to the first shelf signal path group.

20. The method of claim 19 further comprising:

partitioning line card transceiver signals into a second transceiver signal group; and coupling the second transceiver signal troup to the second shelf signal path group.

21. The method of claim 20 wherein the first transceiver signal group comprises spectrally compatible signals and the second transceiver signal group comprises spectrally compatible signals.

22. The method of claim 21 wherein a signal in the first transceiver signal group is spectrally incompatible with a signal in the second transceiver signal group.

23. A system according to claim 11, wherein the first line card and the second line card are the same line cards.

* * * * *